United States Patent [19]

Gloesener

[11] Patent Number: 5,362,790
[45] Date of Patent: * Nov. 8, 1994

[54] IMPACT-RESISTANT COMPOSITIONS BASED ON VINYL CHLORIDE POLYMERS AND THEIR USE

[75] Inventor: Daniel Gloesener, Sart D'Avril-Fernelmont,

[73] Assignee: Solvay (Société Anonyme), Brussels,

[*] Notice: The portion of the term of this patent subsequent to May 25, 2010 has been disclaimed.

[21] Appl. No.: 41,167

[22] Filed: Apr. 1, 1993

Related U.S. Application Data

[63] Continuation-in-part of Ser. No. 826,782, Jan. 28, 1992, Pat. No. 5,214,092.

[30] Foreign Application Priority Data

Apr. 2, 1992 [BE] Belgium .................. 09200311

[51] Int. Cl.$^5$ .................. C08J 3/20; C08K 3/26; C08L 51/00
[52] U.S. Cl. .................. 524/425; 524/427; 524/504; 524/524; 524/527
[58] Field of Search ............. 524/425, 427, 504, 524, 524/527

[56] References Cited

U.S. PATENT DOCUMENTS 3,334,156  8/1967  Calentine et al. .
5,015,669  5/1991  Aumann et al. .
5,214,092  5/1993  Gloesener et al. .................. 524/425

FOREIGN PATENT DOCUMENTS 0074139   3/1983  European Pat. Off. .
1431547   1/1966  France .
251761A1 11/1987  Germany .
1551297   8/1979  United Kingdom .

OTHER PUBLICATIONS

Verified translation of the specification of European Patent 0,074,139.

Primary Examiner—Paul R. Michl
Assistant Examiner—Patrick Niland
Attorney, Agent, or Firm—Spencer, Frank & Schneider

[57] ABSTRACT

Impact-resistant compositions based on vinyl chloride polymers and their use in the extrusion of sections, comprising, as vinyl chloride polymers:
(a) from 3 to 40 parts of vinyl chloride graft copolymer on weakly crosslinked polybutyl acrylate,
(b) from 5 to 85 parts of vinyl chloride graft copolymer on a copolymer of ethylene and vinyl acetate, and
(c) from 10 to 85 parts of unmodified vinyl chloride polymer per 100 parts by weight in all of the combination of the vinyl chloride polymers of the composition and, by way of reinforcing filler,
(d) from 3 to 10 parts of coated calcium carbonate whose elementary particles have a mean diameter smaller than 1 μm per 100 parts by weight of the combination of the vinyl chloride polymers of the composition.

18 Claims, No Drawings

IMPACT-RESISTANT COMPOSITIONS BASED ON VINYL CHLORIDE POLYMERS AND THEIR USE

CROSS REFERENCE TO RELATED APPLICATION

This application is a continuation-in-part of my U.S. application No. 07/826,782 filed Jan. 28th, 1992 now U.S. Pat. No. 5,214,092.

FIELD OF THE INVENTION

The present invention relates to impact-resistant compositions based on vinyl chloride polymers and to their use. It relates more particularly to compositions based on vinyl chloride polymers comprising vinyl chloride polymers grafted onto reinforcing polymers, and to the use of these compositions for the extrusion of sections.

TECHNOLOGY REVIEW

In the extrusion of polyvinyl chloride sections, such as sections for supporting frames for outdoor use, it is well known to make use of compositions comprising reinforcing polymers, generally of elastomeric nature, such as, for example, alkyl acrylate polymers or else copolymers of ethylene and vinyl acetate. These compositions are obtained either by external mixing of polyvinyl chloride with reinforcing polymers of the abovementioned type, or by the use of polyvinyl chloride modified in situ by polymerisation with grafting of vinyl chloride onto such reinforcing polymers, or else by external mixing of modified polyvinyl chloride with reinforcing polymers. Whatever the method of incorporation of the reinforcing polymers, the polyvinyl chloride-based compositions which are specifically recommended for the extrusion of sections for supporting frames for outdoor use generally comprise approximately from 6 to 10 parts by weight of reinforcing polymer per 100 parts by weight of the total of the polymeric constituents of the composition, as well as a few percent of calcium carbonate as coated fine particles. Such compositions usually make it possible to satisfy the quality marks for window frames which are required in some countries, such as, for example, the German RAL quality mark requiring a resilience higher than 20 kJ/m$^2$ with a single U notch on a pressed plaque 4 mm in thickness (according to DIN standard 53453) and a resilience greater than 40 kJ/m$^2$ with a double V notch (according to DIN standard 53753). Nevertheless, the reinforcing polymers generally contribute to reducing the aging-resistance and the rigidity of the polyvinyl chloride-based compositions into which they are incorporated.

SUMMARY OF THE INVENTION

The objective of the present invention is to provide impact-resistant compositions based on vinyl chloride polymers with a superior effectiveness which make it possible to reach performances that are at least equivalent where impact strength is concerned at a lower overall content of reinforcing polymers and which consequently do not exhibit the abovementioned disadvantage of the known compositions.

DETAILED DESCRIPTION OF THE INVENTION

To this end, the present invention relates to impact-resistant compositions based on vinyl chloride polymers, characterised in that they comprise, as vinyl chloride polymers:

(a) from 3 to 40 parts of vinyl chloride graft copolymer on weakly crosslinked polybutyl acrylate containing from 12 to 45% by weight of weakly crosslinked polybutyl acrylate, (b) from 5 to 85 parts of vinyl chloride graft copolymer on a copolymer of ethylene and vinyl acetate containing from 0.5 to 7% by weight of copolymer of ethylene and vinyl acetate, whose intrinsic viscosity, measured at 20° C. in m-xylene, is between approximately 0.05 and 0.10 l/g, (c) from 10 to 85 parts of unmodified vinyl chloride polymer per 100 parts by weight in all of the combination of the vinyl chloride polymers of the composition, and, by way of reinforcing filler:

(d) from 3 to 10 parts of calcium carbonate whose coated elementary particles have a mean diameter smaller than 1 μm per 100 parts by weight of the combination of the vinyl chloride polymers of the composition.

The vinyl chloride graft copolymers on weakly crosslinked polybutyl acrylate, referred to hereinafter by the term "polymers (a)", and the vinyl chloride graft copolymers on a copolymer of ethylene and vinyl acetate, denoted hereinafter by the term "polymers (b)", constitute polymers which are known per se.

A weakly crosslinked polybutyl acrylate is intended to denote polybutyl acrylates obtained by using, in the polymerisation of butyl acrylate, a small quantity of a comonomer containing a number of ethylenic unsaturations, such as, for example, diallyl phthalate or diallyl maleate. The quantity of crosslinking comonomer which is usually employed is approximately at least 0.2% and does not exceed approximately 3% by weight relative to butyl acrylate. In most cases the quantity of crosslinking comonomer which is used is between approximately 0.5 and 1.5% by weight. An advantageous and preferred method of manufacture of the polymers (a) consists in grafting vinyl chloride in aqueous emulsion onto a latex of crosslinked polybutyl acrylate, as described, for example, in patent FR-A-1,431,547 (The General Tire & Rubber Co), incorporated herein by way of reference.

The polymers (a) to which preference is given contain approximately from 25 to 40% by weight of weakly crosslinked polybutyl acrylate.

A copolymer of ethylene and vinyl acetate is intended to denote copolymers containing from 50 to 80% by weight of ethylene, the remainder consisting of vinyl acetate. An advantageous and preferred method of manufacture of the polymers (b), which consists in predispersing the copolymer of ethylene and vinyl acetate in vinyl chloride in the presence of water before subjecting the latter to a polymerisation in aqueous suspension is described in Patent Application EP-A-0,074,139 (Solvay & Cie), also incorporated herein by way of reference.

Polymers (b) to which preference is given contain approximately from 1.5 to 5% by weight of copolymer of ethylene and vinyl acetate.

An unmodified vinyl chloride polymer, referred to hereinafter by the term "polymer (c)", is intended to denote vinyl chloride polymers which do not contain any reinforcing polymer. Polymers (c) to which preference is given consist of vinyl chloride homopolymers. By way of examples of such homopolymers there may be mentioned vinyl chloride homopolymers obtained by polymerisation in aqueous suspension which have a K value (measured at 25° C. in cyclohexanone at a concentration of 5 g/l) ranging from 60 to 70 and more particularly from 64 to 70, as well as vinyl chloride homopolymers obtained by polymerisation in aqueous emulsion which have a K value ranging from 68 to 80, more particularly still from 72 to 76. Polymers (c) which are very particularly preferred are the vinyl chloride homopolymers obtained by polymerisation in aqueous emulsion which have a K value (measured under the conditions referred to above) ranging from 72 to 76.

Calcium carbonate in which the elementary particles are coated is intended to denote calcium carbonates in which the particles are coated by means of an organic compound (coating agent) improving the dispersion of calcium carbonate in vinyl chloride polymers. By way of nonlimiting examples of organic compounds which are usually employed as coating agents there may be mentioned carboxylic fatty acids such as fatty acids containing from 10 to 24 carbon atoms and, preferably, from 12 to 22 carbon atoms, and their mixtures, sulphonic fatty acids such as dodecylbenzenesulphonic acid and organic phosphates and titanates containing long alkyl chains. The coating agent most commonly employed consists of, or includes by way of essential constituents, carboxylic fatty acids such as stearic acid or mixtures of stearic and palmitic acids.

Preference is given, furthermore, to natural or precipitated calcium carbonates in which the elementary particles have a mean diameter of between 0.02 and 0.5 $\mu$m and, more particularly, between 0.05 and 0.3 $\mu$m.

A surprising aspect of the compositions according to the invention lies in the fact that, at identical overall contents of reinforcing agents, they provide resiliences on notched test pieces which are greatly superior to those of compositions containing only polybutyl acrylate as reinforcing agent. The compositions according to the invention are, furthermore, easier to process and exhibit a weldability (measured by means of the static tensile strength of welded assemblies) which is relatively insensitive to changes in welding temperature.

Compositions according to the invention which are preferred comprise, by way of vinyl chloride polymers:
(a) from 5 to 25 parts of vinyl chloride graft copolymer on weakly crosslinked polybutyl acrylate,
(b) from 30 to 75 parts of vinyl chloride graft copolymer on a copolymer of ethylene and vinyl acetate,
(c) from 20 to 50 parts of unmodified vinyl chloride polymer per 100 parts by weight in all of the combination of the vinyl chloride polymers of the composition and, by way of reinforcing filler,
(d) from 5 to 8 parts of calcium carbonate per 100 parts by weight of the combination of the vinyl chloride polymers of the composition.

According to another preferred aspect of the invention, the sum of the contents of weakly crosslinked polybutyl acrylate and of copolymer of ethylene and vinyl acetate in the compositions is smaller than 6 parts and, furthermore, greater than 2 parts per 100 parts by weight in all of the combination of the vinyl chloride polymers of the composition. Particularly preferred compositions are those in which the content of weakly crosslinked polybutyl acrylate is at least 1.5 parts and the content of copolymer of ethylene and vinyl acetate is at least 0.25 parts, the sum of the contents of weakly crosslinked polybutyl acrylate and of copolymer of ethylene and vinyl acetate not exceeding 4.5 parts by weight per 100 parts by weight in all of the combination of the vinyl chloride polymers of the composition.

Besides the characteristic vinyl chloride polymers and the reinforcing filler which are described above, the compositions according to the invention may contain any of the usual ingredients employed in compositions based on vinyl chloride polymers, such as heat stabilisers, processing aids, lubricants, pigments and the like. The compositions according to the invention can be processed in the form of powders or granules, preference being given to the latter.

The compositions according to the invention are particularly suitable for the extrusion of sections, still more particularly of sections for supporting frames for outdoor use. The use of the compositions according to the invention for the extrusion of sections, still more particularly of sections for supporting frames for outdoor use, constitutes another aspect of the present invention.

The examples which follow are intended to illustrate the invention.

EXAMPLES 1 TO 3

Example 1 illustrates a composition according to the invention comprising in all 3.15 parts of reinforcing polymers, that is 1.75 parts of weakly crosslinked polybutyl acrylate (present in the form of a vinyl chloride graft copolymer on a weakly crosslinked polybutyl acrylate) and 1.4 parts of copolymer of ethylene and vinyl acetate (present in the form of a vinyl chloride copolymer grafted onto a copolymer of ethylene and vinyl acetate).

Examples 2R and 3R, given by way of comparison, comprise exclusively by way of reinforcing polymer 3 and 3.9 parts respectively of weakly crosslinked polybutyl acrylate (present in the form of a vinyl chloride copolymer grafted onto a weakly crosslinked polybutyl acrylate).

The weakly crosslinked polybutyl acrylate has been obtained by using approximately 1% by weight of diallyl phthalate in the polymerisation of butyl acrylate.

The vinyl chloride polymers used in Examples 1 to 3 are the following:
polymers (a):
copolymer obtained by aqueous emulsion polymerisation of vinyl chloride in the presence of a latex of weakly crosslinked polybutyl acrylate (as specified above) containing 65% by weight of polyvinyl chloride per 35% by weight of weakly crosslinked polybutyl acrylate (Example 1, according to the invention);
polymer obtained by aqueous suspension polymerisation of vinyl chloride in the presence of a latex of weakly crosslinked polybutyl acrylate (as specified above) containing 94% by weight of polyvinyl chloride and 6% by weight of weakly crosslinked polyacrylate (Examples 2R and 3R, given by way of comparison);
polymer (b): copolymer with a K value of 68 (at 25° C. in cyclohexanone, at a concentration of 5 g/l), obtained by polymerisation of vinyl chloride in aqueous suspension on a copolymer of ethylene and vinyl acetate containing 60% by weight of ethylene, whose intrinsic viscosity, measured at 20° C. in m-xylene, is 0.08 l/g, containing 98 parts by weight of polyvinyl chloride per 2 parts by weight of copolymer of ethylene and vinyl acetate;

polymers (c): vinyl chloride homopolymer obtained in aqueous emulsion, with a K value (measured at 25° C. in cyclohexanone, at a concentration of 5 g/l) of 73 (PVC-E) or in aqueous suspension, with a K value (same conditions) of 64 (PVC-S).

The reinforcing filler (d) consists of precipitated calcium carbonate whose elementary particles have a mean diameter of approximately 0.08 μm and are coated with stearic acid.

The compositions prepared and evaluated are the following, the contents being expressed by weight:

|  | Example 1 | Example 2R | Example 3R |
|---|---|---|---|
| Polymeric constituents: |  |  |  |
| Polymers (a) | 5 | 50 | 65 |
| Polymer (b) | 70 |  |  |
| Polymers (c): |  |  |  |
| PVC-E | 25 | 10 | 15 |
| PVC-S |  | 40 | 20 |
| Reinforcing filler (d): | 6.25 | 6.25 | 6.25 |

Processing ingredients: (identical in nature and quantities in the three examples)

| Dibasic lead phosphite | 3.5 |
|---|---|
| Dibasic lead stearate | 1.5 |
| Calcium stearate | 0.5 |
| Costabiliser of phosphite type | 0.25 |
| Esters of fatty alcohols and acids (lubricants) | 0.6 |
| Acrylic polymer processing aid | 1 |
| Titanium oxide | 4 |

Premixes were prepared in a slow mixer and were then gelled in an internal mixer for approximately 2.5 minutes to be discharged at 160° C. onto a roll mill; the temperatures in the case of the front and rear rolls were 150° and 145° C. respectively. A crepe is removed from these, is cooled in a water trough and then runs into the granulator.

Starting with the granules thus obtained, plaques were pressed under the conditions set out in DIN standard 7748 to evaluate the Charpy toughness with a single U notch according to DIN standard 53453 (test piece 50×6×4 mm).

Furthermore, sections were extruded on a twin-screw machine with conical screws at a rate of 120 kg/h with the following temperature profile:

| barrel | 190° C.-170° C.-150° C. |
|---|---|
| coupling | 160° C. |
| breaker plate | 165° C. |
| head | 165° C. |
| die | 185° C. |
| screw conditioning | 160° C. |

The Charpy toughness with a double V notch was evaluated according to DIN standard 53753 (notch radius 0.1 mm) on test pieces 3 mm in thickness which were taken from the outer face of the sections.

Test pieces taken in an identical manner were used to evaluate Charpy toughness with a single V notch according to BS standard 2782 method 359 (for modified PVC) with a notch radius of 0.1 mm as specified in BS standard 7413.

Sections were also welded under the following conditions:

| temperature of the heating mirror | 265 and 245° C. |
|---|---|
| movement of the section against the mirror | 5.7 mm |
| movement of the section during the assembly | 1.4 mm |
| section preheating time during forward travel against the mirror | 15 s |
| section preheating time when stopped against the mirror | 20 s |
| time of application of the sections against one another during the assembly | 40 s |
| lengths of the arms from the inner corner of the welded angles | 32 cm |
| the beads which formed during the welding were not milled off. |  |

Weld quality was evaluated by measuring the quasi-static tensile strength of the welded angles after heat-conditioning of the sections for 12 hours at 23 degrees in the constant-temperature room, where the evaluation was performed under the conditions which are detailed below:

place one of the arms of the welded angle, fitted with backing shims adapted to the shape of the section, vertically against the rigid support of the test machine. The backing shims are such that they avoid clamping over the rabbets. The horizontal arm is in high position;

clamp the outside of the angle with the aid of a plunger clamp the side faces of the angle with the aid of two other plungers;

the test machine pushes the horizontal arm of the angle vertically upwards with the aid of a round-headed plunger;

Push speed: 50 mm/min

Distance from the inner corner of the welded angle to the thrust axis: 30 cm the maximum strength is recorded when the angle breaks the moments of inertia of the sections are evaluated with the aid of a measurement taken by a video camera and calculation using appropriate software;

the breaking strengths sigma are calculated with the aid of the following formula:

$$\text{sigma [MPa]} = P \text{ [N]} \cdot d \text{ [mm]} \cdot v \text{ [mm]} / I \text{ [mm}^4\text{]}$$

where P: breaking strength d: distance from the inner corner to the point of thrust of the plunger (=30 cm)

v: distance from the neutral rib of the section to the outermost rib subjected to tension during the test I: moment of inertia relative to the axis corresponding to simple flexing of the section.

The results of the evaluation of Charpy toughness are listed in Table I, appended, including the standard deviation measured on 10 test pieces, as are those of the weldability, obtained indirectly from the static tensile strength of the welded assemblies.

Comparison of the results of Example 1 according to the invention with those of Comparison Examples 2R and 3R at similar overall contents of reinforcing agents shows the appreciable superiority of the compositions according to the invention in respect of the Charpy toughness values with a single U notch, with a single V notch and with a double V notch, and of the weldability, which is practically insensitive to a change in the welding temperature, in contrast to that of the compositions evaluated by way of comparison.

EXAMPLES 4 TO 6

Examples 4 and 5, according to the invention, and 6R, given by way of comparison, relate to compositions, all of which contain a total of 4 parts by weight of reinforcing polymers.

Example 4 illustrates a composition comprising 2.6 parts of weakly crosslinked polybutyl acrylate (present in the form of a vinyl chloride graft copolymer on a weakly crosslinked polybutyl acrylate) and 1.4 parts copolymer of ethylene and vinyl acetate (present in the form of a vinyl chloride copolymer grafted onto a copolymer of ethylene and vinyl acetate).

Example 5 illustrates a composition comprising 2.9 parts of polybutyl acrylate (present in the form of a vinyl chloride graft copolymer on a weakly crosslinked polybutyl acrylate) and 1.1 parts of copolymer of ethylene and vinyl acetate (present in the form of a vinyl chloride copolymer grafed onto a copolymer of ethylene and vinyl acetate).

Example 6R illustrates a composition containing parts by weight of weakly crosslinked polybutyl acrylate (present in the form of a vinyl chloride graft copolymer on a weakly crosslinked polybutyl acrylate).

The weakly crosslinked polybutyl acrylate was obtained by using approximately 1% by weight of diallyl phthalate in the polymerisation of butyl acrylate. The vinyl chloride polymers used in Examples 4 to 6 are the following:

polymers (a):
  copolymer obtained by aqueous emulsion polymerisation of vinyl chloride in the presence of a latex of weakly crosslinked polybutyl acrylate (as specified above) containing 73% by weight of polyvinyl chloride per 27% by weight of weakly crosslinked polybutyl acrylate (Example 4 according to the invention and Comparative Example 6R);
  copolymer obtained by aqueous emulsion polymerisation of vinyl chloride in the presence of a latex of weakly crosslinked polybutyl acrylate (as specified above) containing 88% by weight of polyvinyl chloride per 12% by weight of weakly crosslinked polybutyl acrylate (Example 5, according to the invention);
polymer (b): vinyl chloride graft copolymer on a copolymer of ethylene and vinyl acetate identical in all respects to the polymer (b) used in Example 1 according to the invention;
polymers (c):
  vinyl chloride homopolymer obtained in aqueous emulsion, which has a K value of 73 (PVC-E), identical in all respects with that used in Examples 1 to 3R (Examples 4, 5 and 6R)
  vinyl chloride homopolymer obtained in aqueous suspension, which has a K value (measured at 25° C. in cyclohexanone, at a concentration of 5 g/l) of 68 (PVC-S) (Example 6R).

The reinforcing filler is identical with that used in Examples 1 to 3R.

The compositions prepared and evaluated in Examples 4 to 6R are the following, the contents being expressed by weight:

|  | Example 4 | Example 5 | Example 6R |
|---|---|---|---|
| Polymeric constituents: |  |  |  |
| Polymers (a) | 9.5 | 24 | 14.7 |
| Polymer (b) | 70.5 | 56 |  |
| Polymers (c): |  |  |  |
| PVC-E | 20 | 20 | 20 |
| PVC-S |  |  | 65.3 |
| Reinforcing filler (d): | 6.25 | 6.25 | 6.25 |

Processing ingredients: (identical in nature and quantity with those used in Examples 1 to 3R.

Premixes were prepared in a fast mixer and were then gelled in a compounding extruder with screws rotating in parallel (diameter 30 mm) at a rate of 50 kg/h with a temperature profile: 60° C.–90° C.–180° C.–180° C. On leaving the twin-screw stage, the stock is taken up by a single screw which pressurises it and passes it through the granulation die. The granules thus obtained were used to extrude sections on a twin-screw machine with conical screws, whose mixing power is higher than that of the conical screws used in Examples 1 to 3R, with the following temperature profile:

| barrel | 160° C.-155° C.-150° C. |
|---|---|
| coupling | 160° C. |
| breaker plate | 165° C. |
| head | 165° C. |
| die | 185° C. |
| screw conditioning | 100° C. |

Test pieces 3 mm in thickness taken from the outer face of the sections were used to evaluate the Charpy toughness with a single V notch according to BS standard 2782 method 359 (for modified PVC) with a notch radius of 0.1 mm as specified in BS standard 7413. The results, including the standard deviation measured on 10 test pieces, appear below.

|  | Example 4 | Example 5 | Example 6R |
|---|---|---|---|
| Single V notch Charpy toughness according to BS standard 7413, kJ/m$^2$ | 14.7** | 14.4** | 12.3** |
| Standard deviation (kJ/m$^2$) | 2.2 | 1.9 | 2 |

**Exclusively brittle fractures

Comparison of the results of the examples 4 and 5 according to the invention with those of Comparative Example 6R, all at identical overall content of reinforcing agent(s) shows the superiority of the compositions according to the invention under extrusion conditions which are critical from the viewpoint of toughness.

TABLE I

|  | Ex. 1 | Ex 2R | Ex. 3R |
|---|---|---|---|
| Single U notch Charpy toughness according to DIN standard 53453 (kJ/m$^2$) | 48 | 32 | 33 |
| Standard deviation (kJ/m$^2$) | 7.5 | 12.3 | 13.6 |
| Double V notch Charpy toughness according to DIN standard 53753 (kJ/m$^2$) | 52 | 38 | 45 |
| Standard deviation (kJ/m$^2$) | 3.5 | 9.6 | 8.6 |
| Single V notch Charpy | * | 7.15** | 8.40** |

TABLE I-continued

|  | Ex. 1 | Ex 2R | Ex. 3R |
|---|---|---|---|
| toughness according to BS standard 7413, kJ/m² |  |  |  |
| Standard deviation (kJ/m²) |  | 0.7 | 0.7 |
| Static tensile strength of welded assemblies (MPa) |  |  |  |
| welding temperature = 265° C. | 53 | 55 | 53 |
| welding temperature = 245° C. | 49 | 30 | 29 |

*Exclusively ductile fractures
**Exclusively brittle fractures

I claim:

1. An impact-resistant composition comprising:
   (a) from about 3 to 40 parts of vinyl chloride graft copolymer on weakly crosslinked polybutyl acrylate containing from 12 to 45% by weight of weakly crosslinked polybutyl acrylate,
   (b) from about 5 to 85 parts of vinyl chloride graft copolymer on a copolymer of ethylene and vinyl acetate, containing from 0.5 to 7% by weight of copolymer of ethylene and vinyl acetate whose intrinsic viscosity, measured at 20° C. in m-xylene, is between approximately 0.05 and 0.10 l/g, and
   (c) from about 10 to 85 parts of unmodified vinyl chloride polymer,
   per 100 parts by weight in all of the combination of the vinyl chloride polymers of (a), (b), and (c) and,
   (d) from about 3 to 10 parts of coated calcium carbonate whose elementary particles have a mean diameter smaller than 1 μm per 100 parts by weight of the combination of the vinyl chloride polymers of (a), (b) and (c).

2. An impact-resistant composition according to claim 1, wherein the vinyl chloride polymer (a) contains approximately from 25 to 40% by weight of weakly crosslinked polybutyl acrylate.

3. An impact-resistant composition according to claim 1, wherein the vinyl chloride polymer (b) contains approximately from 1.5 to 5% by weight of copolymer of ethylene and vinyl acetate.

4. An impact-resistant composition according to claim 1, wherein the vinyl chloride polymer (c) consists of a vinyl chloride homopolymer.

5. An impact-resistant composition according to claim 1, wherein they comprise, as vinyl chloride polymers:
   (a) from 5 to 25 parts of vinyl chloride graft copolymer on weakly crosslinked polybutyl acrylate,
   (b) from 30 to 75 parts of vinyl chloride graft copolymer on a copolymer of ethylene and vinyl acetate,
   (c) from 20 to 50 parts of unmodified vinyl chloride polymer
   per 100 parts by weight in all of the combination of the vinyl chloride polymers of the composition and, by way of reinforcing filler,
   (d) from 5 to 8 parts of coated calcium carbonate per 100 parts by weight of the combination of the vinyl chloride polymers of the composition.

6. An impact-resistant composition according to claim 1, wherein the sum of the contents of weakly crosslinked polybutyl acrylate and of copolymer of ethylene and vinyl acetate is smaller than 6 parts per 100 parts by weight in all of the combination of the vinyl chloride polymers of the composition.

7. An impact-resistant composition according to claim 1, wherein the sum of the contents of weakly crosslinked polybutyl acrylate and of copolymer of ethylene and vinyl acetate is greater than 2 parts per 100 parts by weight in all of the combination of the vinyl chloride polymers of the composition.

8. An impact-resistant composition according to claim 1, wherein the content of weakly crosslinked polybutyl acrylate is at least 1.5 parts and the content of copolymer of ethylene and vinyl acetate at least 0.25 parts, the sum of the contents of weakly crosslinked polybutyl acrylate and of copolymer of ethylene and vinyl acetate not exceeding 4.5 parts by weight per 100 parts by weight in all of the combination of the vinyl chloride polymers of the composition.

9. In a method for extruding sections, the step using a composition as defined in claim 1.

10. In a method for extruding sections for supporting frames for outdoor use, the step of using a composition as defined in claim 1.

11. In an extruded section, the improvement comprising said extruded section comprising an impact-resistance composition according to claim 1.

12. In an extruded section of a supporting frame for outdoor use, the improvement comprising said extruded section comprising an impact-resistant composition according to claim 1.

13. An impact-resistant composition comprising:
   (a) from about 3 to 40 parts of vinyl chloride graft copolymer on weakly crosslinked polybutyl acrylate containing from 25 to 40% by weight of weakly crosslinked polybutyl acrylate,
   (b) from about 5 to 85 parts of vinyl chloride graft copolymer on a copolymer of ethylene and vinyl acetate, containing from 0.5 to 7% by weight of copolymer of ethylene and vinyl acetate whose intrinsic viscosity, measured at 20° C. in m-xylene, is between approximately 0.05 and 0.10 l/g,
   (c) from about 10 to 85 parts of unmodified vinyl chloride polymer,
   per 100 parts by weight in all of the combination of the vinyl chloride polymers of (a), (b), and (c) and,
   (d) from about 3 to 10 parts of coated calcium carbonate whose elementary particles have a mean diameter smaller than 1 μm per 100 parts by weight of the combination of the vinyl chloride polymers of (a), (b), and (c).

14. An impact-resistant composition according to claim 13, wherein the vinyl chloride polymer (b) contains approximately from 1.5 to 5% by weight of copolymer of ethylene and vinyl acetate.

15. An impact-resistant composition according to claim 13, wherein said vinyl chloride polymers comprise:
   (a) from about 5 to 25 parts of vinyl chloride graft copolymer on weakly crosslinked polybutyl acrylate,
   (b) from about 30 to 75 parts of vinyl chloride graft copolymer on a copolymer of ethylene and vinyl acetate,
   (c) from about 20 to 50 parts of unmodified vinyl chloride polymer
   per 100 parts by weight in all of the combination of the vinyl chloride polymers of the composition and, by way of reinforcing filler,
   (d) from about 5 to 8 parts of coated calcium carbonate per 100 parts by weight of the combination of the vinyl chloride polymers of the composition.

16. An impact-resistant composition according to claim 13, wherein the sum of the contents of weakly crosslinked polybutyl acrylate and of copolymer of ethylene and vinyl acetate is smaller than about 6 parts per 100 parts by weight in all of the combination of the vinyl chloride polymers of the composition.

17. An impact-resistant composition according to claim 13, wherein the sum of the contents of weakly crosslinked polybutyl acrylate and of copolymer of ethylene and vinyl acetate is greater than about 2 parts per 100 parts by weight in all of the combination of the vinyl chloride polymers of the composition.

18. In an extruded section, the improvement comprising said extruded section comprising an impact-resistance composition according to claim 13.

* * * * *